(12) United States Patent
Kang et al.

(10) Patent No.: US 10,909,158 B2
(45) Date of Patent: Feb. 2, 2021

(54) METHOD AND APPARATUS FOR GENERATING INFORMATION

(71) Applicant: Baidu Online Network Technology (Beijing) Co., Ltd., Beijing (CN)

(72) Inventors: Jianfeng Kang, Beijing (CN); Jian Sun, Beijing (CN); Bo Wen, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 154 days.

(21) Appl. No.: 16/158,702

(22) Filed: Oct. 12, 2018

(65) Prior Publication Data

US 2019/0147063 A1 May 16, 2019

(30) Foreign Application Priority Data

Nov. 16, 2017 (CN) .......................... 2017 1 1139944

(51) Int. Cl.
| | |
|---|---|
| *G06F 16/35* | (2019.01) |
| *G06F 16/435* | (2019.01) |
| *G06F 16/22* | (2019.01) |
| *G06Q 30/00* | (2012.01) |
| *G06F 16/9035* | (2019.01) |

(52) U.S. Cl.
CPC ........ *G06F 16/355* (2019.01); *G06F 16/2264* (2019.01); *G06F 16/435* (2019.01); *G06F 16/9035* (2019.01); *G06Q 30/00* (2013.01)

(58) Field of Classification Search
USPC ........................................................ 707/737
See application file for complete search history.

(56) References Cited

U.S. PATENT DOCUMENTS

2010/0293050 A1* 11/2010 Maher .................. G06F 16/337
705/14.46
2016/0171540 A1* 6/2016 Mangipudi ........ G06Q 30/0255
705/14.53

* cited by examiner

*Primary Examiner* — Hung T Vy
(74) *Attorney, Agent, or Firm* — Knobbe, Martens, Olson & Bear, LLP (57) ABSTRACT

A method and apparatus for generating information are provided. An embodiment of the method includes: collecting characteristic information of a target user, and dividing the collected characteristic information into at least two dimensions, the characteristic information including user information and user behavior information; selecting the dimension associated with a target service type from the plurality of dimensions; and generating a target number of characteristic information sets based on cluster analysis on the characteristic information in the selected dimension. The embodiment can generate a characteristic information set corresponding to a user of any service type using the characteristic information of the target user, thereby improving the universality of the method for generating information.

11 Claims, 6 Drawing Sheets

METHOD AND APPARATUS FOR GENERATING INFORMATION

CROSS-REFERENCE TO RELATED APPLICATIONS

This application claims priority to Chinese Patent Application no. 201711139944.7, filed with the China National Intellectual Property Administration (CNIPA) on Nov. 16, 2017, the contents of which are incorporated herein by reference in their entirety.

TECHNICAL FIELD

Embodiments of the disclosure relate to the field of computer technology, specifically to the field of Internet technology, and more specifically to a method and apparatus for generating information.

BACKGROUND

Different services provide personalized information push and other services to different user group. Therefore, before different services provide information push and other services to the users, it is necessary to understand the user group. In order to realize understanding the user groups in various industries, we often need to divide the characteristic information of the users into sets with the help of the user information and user behavior information of the users, thereby providing the users with personalized services and products. In the existing technologies, it is usually necessary to obtain the characteristic information of the users by designing questionnaires for people associated with the service type, tracking events of associated websites, or the like, thereby generating characteristic information sets of the users. Furthermore, for different types of services, it is usually necessary to acquire the characteristic information of the users using different questionnaires for people or event tracking websites, to generate the characteristic information sets of the users.

SUMMARY

Embodiments of the disclosure present a method and apparatus for generating information.

In a first aspect, an embodiment of the disclosure provides a method for generating information. The method includes: collecting characteristic information of a target user, and dividing the collected characteristic information into at least two dimensions, the characteristic information including user information and user behavior information; selecting the dimension associated with a target service type from the plurality of dimensions; and generating a target number of characteristic information sets based on cluster analysis on the characteristic information in the selected dimension.

In some embodiments, the method further includes: analyzing the characteristic information in each of the characteristic information sets to determine distinguishing characteristic information of the each of the characteristic information sets. The distinguishing characteristic information is used for distinguishing the collected characteristic information from the characteristic information sets.

In some embodiments, the generating a target number of characteristic information sets based on cluster analysis on the characteristic information in the selected dimension includes: setting a K value, where K is a preset number of the characteristic information sets, and K is a positive integer; executing following clustering based on the K value: generating M of the characteristic information sets by the cluster analysis on the characteristic information in the selected dimension using the K value as an initial value of a clustering algorithm, where M is a positive integer; and determining the target number of the characteristic information sets being M in response to determining that M≥K−N, where N is a preset number of tolerable deficiency of the characteristic information sets, and N is a positive integer; and setting K+1 as the K value and continuing the clustering in response to determining that M<K−N.

In some embodiments, the analyzing the characteristic information in each of the characteristic information sets to determine distinguishing characteristic information of the each of the characteristic information sets includes: establishing a user persona group for the each of the characteristic information sets respectively, and performing multi-dimensional description on a user persona in each of the user persona groups based on the characteristic information in the each of the characteristic information sets; determining a first proportion of the number of the user personas having the characteristic information in a first dimension in the each of the user persona groups to the number of the user personas in the each of the user persona groups, where the first dimension is any dimension of the user persona description; determining a second proportion of the number of users having the characteristic information in the first dimension among the target users to the number of the target users; calculating a ratio of the second proportion to the first proportion, and arranging the characteristic information sets in descending order of the ratio, to generate a characteristic information set queue; and acquiring a first preset number of the characteristic information sets successively from the characteristic information set queue, and using the characteristic information in the first dimension as the distinguishing characteristic information of the acquired characteristic information sets.

In some embodiments, the method further includes: determining a third proportion of the number of user personas having the characteristic information in an interesting dimension in a first user persona group to the number of the user personas in the first user persona group, where the first user persona group is any one of the user persona groups; and determining the characteristic information in the interesting dimension as the distinguishing characteristic information of the characteristic information set corresponding to the first user persona group, in response to determining the third proportion being greater than a preset threshold.

In some embodiments, the method further includes: obtaining a plurality of reserved characteristic information sets by the cluster analysis on the collected characteristic information, and determining a tag of each of the reserved characteristic information sets; and determining, based on similarity between each of the characteristic information sets and the each of the reserved characteristic information sets, the tag of the each of the characteristic information sets.

In a second aspect, an embodiment of the disclosure provides an apparatus for generating information. The apparatus includes: an acquisition unit, configured for collecting characteristic information of a target user, and dividing the collected characteristic information into at least two dimensions, the characteristic information including user information and user behavior information; a selection unit, configured for selecting the dimension associated with a target service type from the plurality of dimensions; and a clustering unit, configured for generating a target number of characteristic information sets based on cluster analysis on the characteristic information in the selected dimension.

In some embodiments, the apparatus further includes: a determination unit, configured for analyzing the characteristic information in each of the characteristic information sets to determine distinguishing characteristic information of the each of the characteristic information sets. The distinguishing characteristic information is used for distinguishing the collected characteristic information from the characteristic information sets.

In some embodiments, the clustering unit includes: a setting module, configured for setting a K value, where K is a preset number of the characteristic information sets, and K is a positive integer; a first execution module, configured for executing following clustering based on the K value: generating M of the characteristic information sets by the cluster analysis on the characteristic information in the selected dimension using the K value as an initial value of a clustering algorithm, where M is a positive integer; and determining the target number of the characteristic information sets being M in response to determining that M≥K−N, where N is a preset number of tolerable deficiency of the characteristic information sets, and N is a positive integer; and a second execution module, configured for setting K+1 as the K value and continuing the clustering in response to determining that M<K−N.

In some embodiments, the determination unit is specifically configured for: establishing a user persona group for the each of the characteristic information sets respectively, and performing multi-dimensional description on a user persona in each of the user persona groups based on the characteristic information in the each of the characteristic information sets; determining a first proportion of the number of the user personas having the characteristic information in a first dimension in the each of the user persona groups to the number of the user personas in the each of the user persona groups, where the first dimension is any dimension of the user persona description; determining a second proportion of the number of users having the characteristic information in the first dimension among the target users to the number of the target users; calculating a ratio of the second proportion to the first proportion, and arranging the characteristic information sets in descending order of the ratio, to generate a characteristic information set queue; and acquiring a first preset number of the characteristic information sets successively from the characteristic information set queue, and using the characteristic information in the first dimension as the distinguishing characteristic information of the acquired characteristic information sets.

In some embodiments, the determination unit is further configured for: determining a third proportion of the number of user personas having the characteristic information in an interesting dimension in a first user persona group to the number of the user personas in the first user persona group, where the first user persona group is any one of the user persona groups; and determining the characteristic information in the interesting dimension as the distinguishing characteristic information of the characteristic information set corresponding to the first user persona group, in response to determining the third proportion being greater than a preset threshold.

In some embodiments, the apparatus further includes: a tag setting unit, configured for: obtaining a plurality of reserved characteristic information sets by the cluster analysis on the collected characteristic information, and determining a tag of each of the reserved characteristic information sets; and determining, based on similarity between each of the characteristic information sets and the each of the reserved characteristic information sets, the tag of the each of the characteristic information sets.

The method and apparatus for generating information provided by embodiments of the disclosure collect user information and user behavior information of all target users as characteristic information, then divide the collected characteristic information into dimensions, then select a dimension associated with a target service type from the dimensions; and finally obtain a target number of characteristic information sets based on cluster analysis on the characteristic information in the acquired dimension, thereby achieving a goal of generating a characteristic information set of any service type by effectively using the characteristic information of the target user, and improving the universality of the method for generating information.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
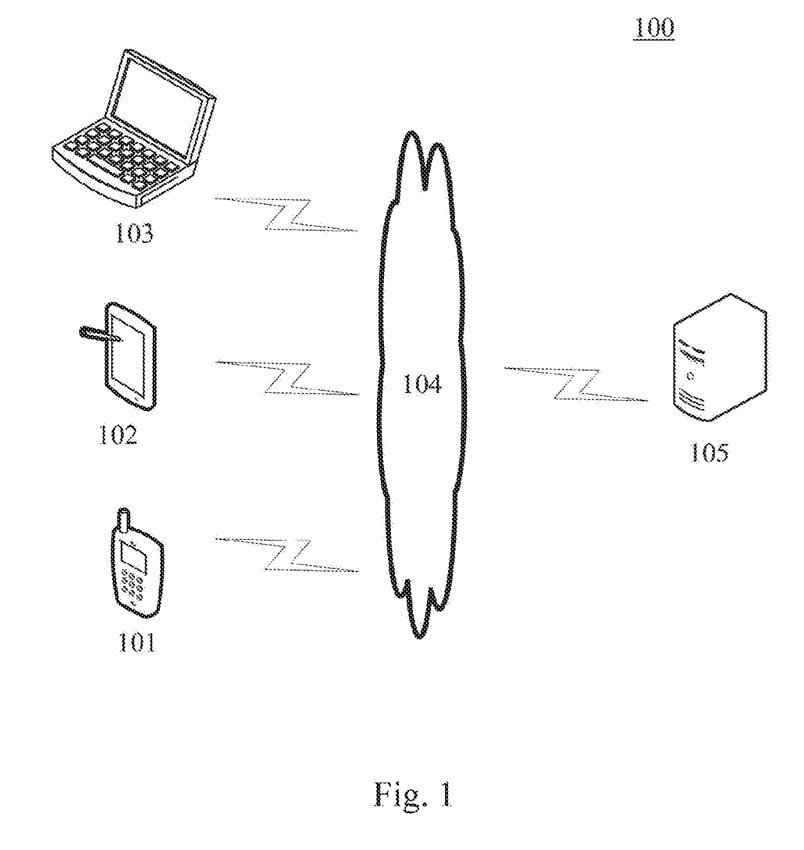
FIG. 1 is a structural diagram of an illustrative system in which the disclosure may be practiced according to some embodiments.

FIG. 1 shows an illustrative architecture of a system 100 which may be used by a method for generating information or an apparatus for generating information according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Various communication client applications, such as webpage browser applications, shopping applications, search applications, instant messaging tools, mailbox clients, and social platform software may be installed on the terminal devices 101, 102, and 103.

The terminal devices 101, 102, and 103 may be various electronic devices having a display and capable of supporting the user in browsering a webpage or online payment, including but not limited to, smart phones, tablet computers, e-book readers, MP3 (Moving Picture Experts Group Audio Layer III) players, MP4 (Moving Picture Experts Group Audio Layer IV) players, laptop computers, and desktop computers.

The server 105 may be a server providing various services, for example, a back end server performing cluster analysis on the user behavior information collected from the terminal device 101, 102 or 103. The back end server may return a processing result of the cluster analysis to the terminal device.

It should be noted that the method for generating information according to the embodiments of the present application is generally executed by the server 105. Accordingly, the apparatus for generating information is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
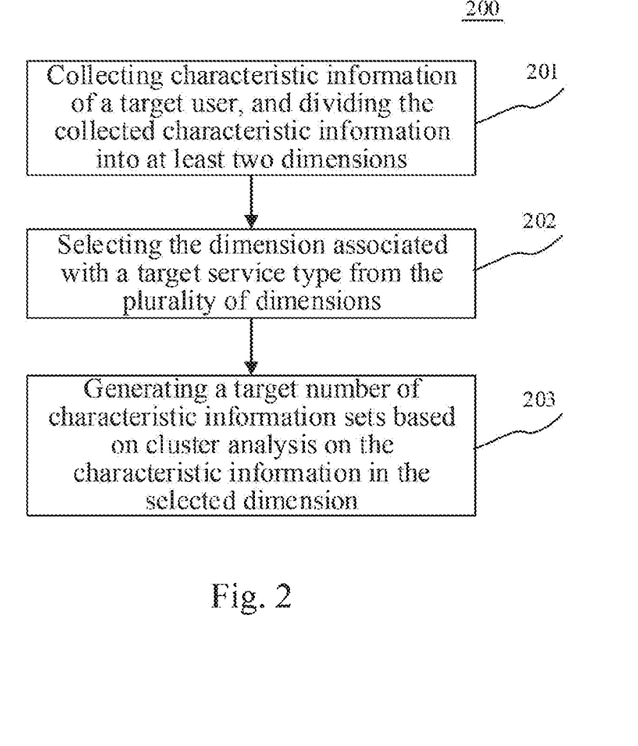
FIG. 2 is a process diagram of a method for generating information according to some embodiments of the disclosure.

Further referring to FIG. 2, a process 200 of an embodiment of a method for generating information according to the disclosure is shown. The method for generating information includes:

Step 201: collecting characteristic information of a target user, and dividing the collected characteristic information into at least two dimensions.

In the embodiment, an electronic device (e.g., the server shown in FIG. 1) on which the method for generating information runs may collect user information and user behavior information of a target user from the target user using a terminal device whereby the target user performs operations, such as webpage browsing, online payment, and user registration, by wired connection or wireless connection. The user information and the user behavior information may be the characteristic information of the user. Here, the target user may be all users using one or more applications (e.g., search-based applications, or shopping applications) installed on the terminal device. Usually, when a user is performing an operation, such as webpage browsing, website registration, or online payment, using an application installed on the terminal, the electronic device may acquire the user information, such as user's nickname, age, gender, and geographical location, from the terminal device, and acquire the user behavior information, such as a user consumption level, a user preference, and an interest. Then, the electronic device may divide the collected characteristic information of the target user into a plurality of dimensions, to divide the collected characteristic information into at least two dimensions. It should be noted that the wireless connection type may include, but is not limited to, 3G/4G connection, WiFi connection, Bluetooth connection, WiMAX connection, Zigbee connection, UWB (ultra wideband) connection, and other wireless connections that are known at present or are to be developed in the future.

Usually, the electronic device may divide characteristic information of Internet users into high dimensions. For example, the electronic device may divide the characteristic information of the target user into 100,000-dimensional high-dimensional characteristics based on different service types and different categories included in the service types. The high-dimensional characteristics may include the dimensions, such as car beauty, car sales, car maintenance, and second hand cars. The electronic device may also divide the characteristic information of the network-wide users into low dimensions. For example, the electronic device may divide the characteristic information of the target user into 2,000-dimensional low-dimensional characteristics based on different service types. The low-dimensional characteristics may include the dimensions, such as cars, finance, and retailing. In practice, a person having ordinary skill in the art may divide the collected characteristic information of the target user into dimensions based on actual needs of different service types, which is not uniquely defined here.

Step 202: selecting the dimension associated with a target service type from the plurality of dimensions.

In the embodiment, based on the at least two dimensions divided in the step 201, the electronic device may acquire service information of a target service type based on the actual service scenario of the target service type, and filter the divided dimensions by various means using the service information of the target service, to acquire a dimension associated with the target service type, and then determine the characteristic information in the acquired dimension. As an example, the target service type may be a car service, and the electronic device may match car service information in the divided dimensions, to filter dimensions associated with the car service, such as car beauty, car sales, car maintenance, and second hand cars. It can be seen that, the electronic device may automatically acquire the characteristic information of different service types by dividing the collected characteristic information of the target user into a plurality of dimensions.

Step 203: generating a target number of characteristic information sets based on cluster analysis on the characteristic information in the selected dimension.

In the embodiment, the electronic device may acquire characteristic information in the dimension associated with the target service type based on the selected dimension associated with the target service type in the step 202. Then, the electronic device may generate a target number of characteristic information sets based on cluster analysis on the characteristic information in the selected dimension. In general, the cluster analysis may divide identical or similar objects into one group. Thus, by the cluster analysis on the characteristic information associated with the target service type, the characteristic information of the target user may be divided into a number of sets based on the similarity of the characteristic information. Each of the sets is a characteristic information set. It can be seen that the electronic device may implement clustering the characteristic information of the user of any service type using this method, and it is unnecessary to cluster the characteristic information separately for different service types. Therefore, the method is strongly universal.

Usually, after dividing the relevant characteristic information of the target service type, a number of characteristic information sets may be obtained, characteristics between the target users corresponding to a given characteristic information set are very similar, while characteristics between the target users corresponding to different characteristic information sets are greatly different. Therefore, when pushing information to users, users corresponding to a given characteristic information set may be used as a given entirety, thus enhancing the pertinence of information push.

Figure 3:
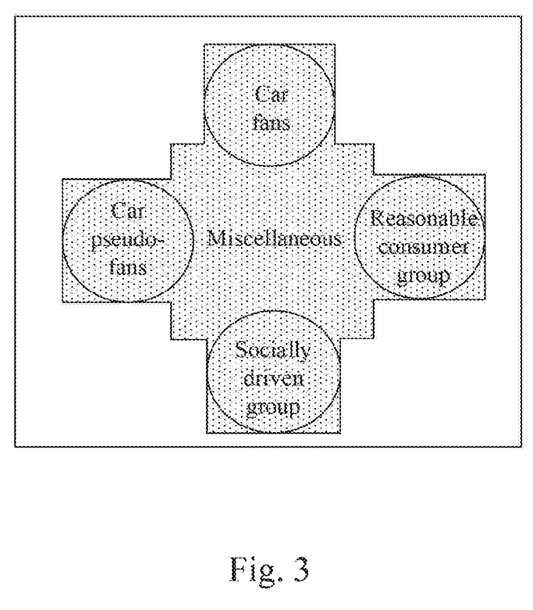
FIG. 3 is a schematic diagram of an application scenario of a method for generating information according to some embodiments of the disclosure.

Further referring to FIG. 3, a schematic diagram of an application scenario of a method for generating information according to the embodiment is shown in FIG. 3. In the application scenario of FIG. 3, the car service is used as a target service type, and its user groups are subdivided. First, a back end server may collect the characteristic information of the target users and divide the characteristic information into dimensions; then filter dimensions associated with the car service, such as car beauty, car sales, car maintenance, and second hand cars, from the dimensions, and the filtered dimensions may include the user information, such as user's nickname, gender, age, and community's value, and the user behavior information, such as followed car brands, and car maintenance frequency; and then the back end server may divide the characteristic information of the target user associated with the car service into a plurality of characteristic information sets by the cluster analysis on the characteristic information in the filtered dimensions. Here, in order to distinguish between the generated characteristic information sets, the characteristic information sets may be named as "car fans," "reasonable consumer group," "socially driven group," "car pseudo-fans," "miscellaneous," and the like respectively, as shown in FIG. 3.

The method for generating information provided by the above embodiments of the disclosure collects user information and user behavior information of the target users as the characteristic information, then divides the collected characteristic information into dimensions, then acquires a dimension associated with the target service type from the dimensions; and finally generates a target number of characteristic information sets based on cluster analysis on the characteristic information in the selected dimension, thereby effectively using the characteristic information of the target user, achieving a goal of generating characteristic information sets by subdividing characteristic information of any target service type, and improving the universality of the method for generating information.

Figure 4:
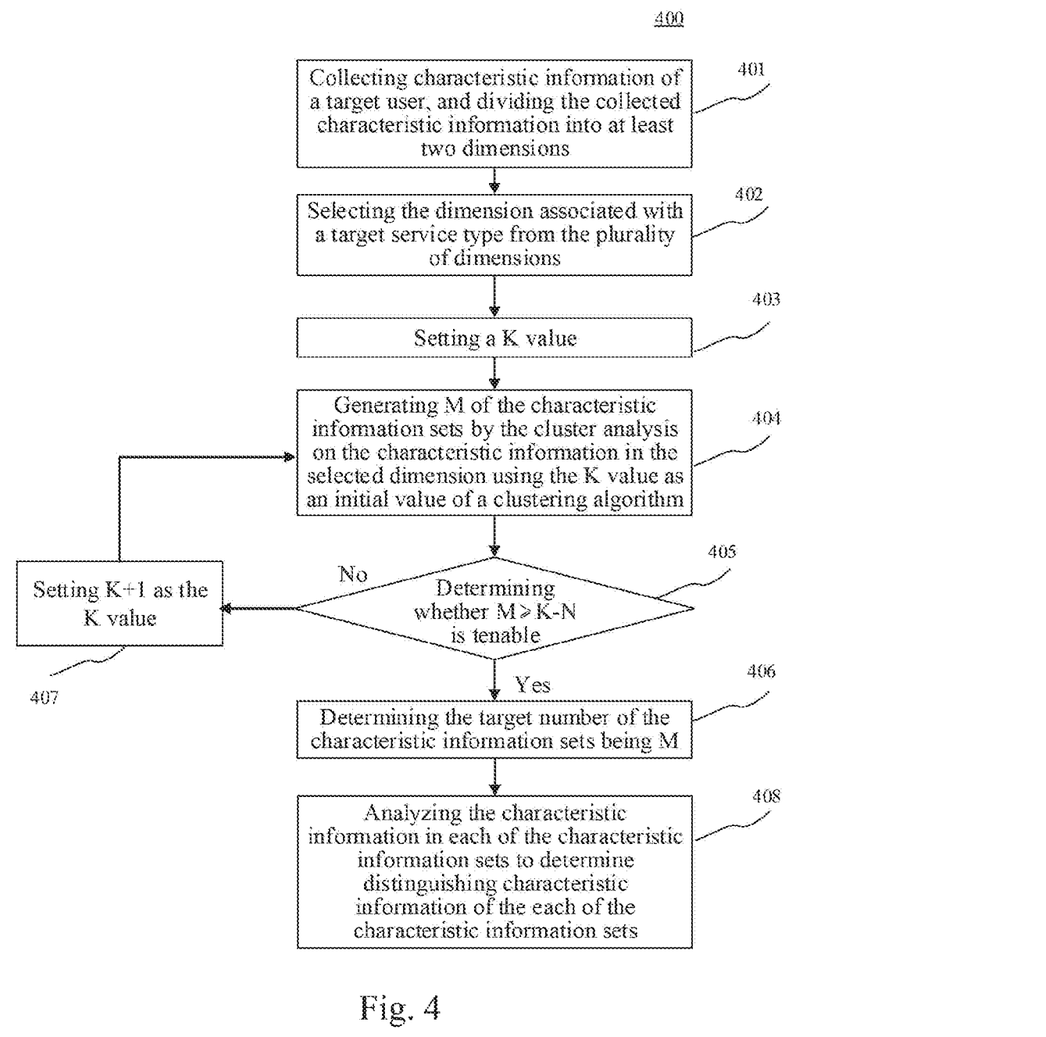
FIG. 4 is a process diagram of another method for generating information according to some embodiments of the disclosure.

Further referring to FIG. 4, a process 400 of another embodiment of a method for generating information according to the embodiment is shown. The method for generating information according to the embodiment may include:

Step 401: collecting characteristic information of a target user, and dividing the collected characteristic information into at least two dimensions.

In the embodiment, an electronic device (e.g., the server shown in FIG. 1) on which the method for generating information runs may collect user information and user behavior information of the target users from the target users using a terminal device whereby the target user performs operations, such as webpage browsing, online payment, and user registration, by wired connection or wireless connection. The user information and the user behavior information may be the characteristic information of the user. Then, the electronic device may divide the collected characteristic information of the target user into a plurality of dimensions, to divide the collected characteristic information into at least two dimensions.

Step 402: selecting the dimension associated with a target service type from the plurality of dimensions.

In the embodiment, based on the at least two dimensions divided in the step 401, the electronic device may acquire service information of a target service type based on the actual service scenario of the target service type, and filter the divided dimensions by various means using the service information of the target service, to acquire a dimension associated with the target service type, and then determine the characteristic information in the acquired dimension.

Step 403: setting a K value.

In the embodiment, the electronic device may cluster the characteristic information in the selected dimension based on the selected dimension associated with the target service type in the step 402. Specifically, the electronic device may preset a K value of the clustering algorithm. The K value may denote a preset number of the characteristic information sets. Usually, the K value may be set based on the actual needs of the target service type. For example, if the car service needs to divide its users into 10 groups, then the K value may be set as 10, i.e., 10 characteristic information sets are finally generated using the characteristic information in the selected dimension. Alternatively, the K value may also be determined based on the total number of the users associated with the target service type. For example, if the number of the users corresponding to the car service is greater than 1,000,000, then the K value may be set as 20. Here, the K may be a positive integer.

Step 404: generating M of the characteristic information sets by the cluster analysis on the characteristic information in the selected dimension using the K value as an initial value of the clustering algorithm.

In the embodiment, the electronic device may generate M of the characteristic information sets by the cluster analysis on the characteristic information in a dimension associated with the target service type with the K value set in the step 403 as an initial value of the clustering algorithm. This step may enable similarity of the characteristic information in each of the characteristic information sets to be maximized. Here, the M may be a positive integer. The preset number K of the characteristic information sets of the target service type may be different from the number M of the final characteristic information sets generated by the cluster analysis. In this case, the electronic device needs to compare the number M of the generated characteristic information sets with the preset number K of the characteristic information sets.

Step 405: determining whether $M \leq K-N$ is tenable.

In the embodiment, when clustering the characteristic information in the dimension associated with the target service type, the target number of the to-be-generated characteristic information sets may be a range. Thus, when clustering the characteristic information in the dimension associated with the target service type, the electronic device may preset the number N of tolerable deficiency of the characteristic information sets based on the preset number K of the characteristic information sets. Based on the M characteristic information sets generated in the step 404, the electronic device may determine whether the M is within the range of tolerable deficiency in the number K of the characteristic information sets. That is, the electronic device may determine whether $M \leq K-N$ is tenable, and turn to step 406 if $M \leq K-N$ is tenable; and turn to step 407 if $M \leq K-N$ is not tenable.

Step 406: determining the target number of the characteristic information sets being M.

In the embodiment, based on the $M \leq K-N$ being tenable determined in the step 405, the electronic device may determine the number M of the characteristic information sets generated by clustering being within the range of the number of tolerable deficiency of the characteristic information sets. For example, it is necessary to generate 8 to 10 characteristic information sets for a target service type, and the K value may be set as 10. In this case, the number N of tolerable deficiency of the characteristic information sets may be 2, and when the number M of the generated characteristic information sets is 8, 9, or 10, the number M of the generated characteristic information sets is within the range of the number of tolerable deficiency of the characteristic information sets.

Step 407: setting K+1 as the K value.

In the embodiment, based on the M≤K−N being not tenable determined in the step 405, i.e., M<K−N, the electronic device may determine the number M of the characteristic information sets generated by the cluster analysis being beyond the range of tolerable deficiency in the number K of the characteristic information sets. In this case, it is necessary to readjust the K value of the clustering algorithm. Specifically, when M<K−N, the original K value plus 1 may be reset as the K value for the clustering operation, i.e., recurrently executing the step 404 by setting K+1 as the K value, until determining M≤K−N. Thus, the number M of the finally generated characteristic information sets is within the range of the number of tolerable deficiency of the characteristic information sets, thereby obtaining the target number of the characteristic information sets.

Step 408: analyzing the characteristic information in each of the characteristic information sets to determine distinguishing characteristic information of the each of the characteristic information sets.

In the embodiment, for the target number of the generated characteristic information sets, the electronic device may further analyze or explain the characteristic information in the characteristic information sets, and determine the distinguishing characteristic information in each of the characteristic information sets. Here, the distinguishing characteristic information may distinguish the characteristic information collected by the electronic device from the characteristic information set. For example, for any characteristic information set, a type of characteristic information accounts for a very high proportion in the any characteristic information set, and the type of characteristic information accounts for a very small proportion in the characteristic information collected by the electronic device. In this case, the type of characteristic information may distinguish the any characteristic information set from the characteristic information collected by the electronic device. The type of characteristic information is the distinguishing characteristic information of the any characteristic information set. This step may determine the distinguishing characteristic information specific to a characteristic information set. The target service type may push customized information to the users corresponding to the characteristic information set based on the specific distinguishing characteristic information.

In some optional implementations of the embodiment, in order to determine the distinguishing the characteristic information in each of the characteristic information sets, the electronic device may first establish a user persona group for the each of the characteristic information sets respectively. The user persona group may be understood as a user target model group established based on the characteristic information in the each of the characteristic information sets. Therefore, the electronic device may perform multi-dimensional description on the user persona in each of the user persona groups based on the characteristic information in the each of the characteristic information sets after establishing the user persona groups. The dimension here may include the dimensions, such as common demographic attributes, device information, geographical locations, and interests.

In some optional implementations of the embodiment, the electronic device may further analyze the user persona in each of the user persona groups in each dimension. Specifically, the electronic device may determine the number c of user personas having the characteristic information in a first dimension in the each of the user persona groups, and the number d of the users having the characteristic information in the first dimension among all target users; then determine the total number e of the user personas in the each of the user persona groups, and determine a total number f of all target users; then calculate a value of a first proportion g of the number c of the user personas having the characteristic information in the first dimension in the each of the user persona groups to the total number e of the user personas in the each of the user persona groups, g=c/e, and calculate a value of a second proportion h of the number d of the users having the characteristic information in the first dimension among all target users to the total number f of all target users, h=d/f; and finally calculate a ratio of the second proportion h to the first proportion g, and arrange the characteristic information sets in descending order of the calculated ratios to form a characteristic information set queue. The electronic device may select characteristic information sets corresponding to the top a ratios from the characteristic information set queue, and the a here may be a first preset number. The characteristic information in the first dimension may be used as the distinguishing characteristic information in the selected a characteristic information sets. The first dimension may be any dimension of the user persona description.

In some optional implementations of the embodiment, for an interesting dimension in the user persona group, the electronic device may determine the distinguishing characteristic information in the interesting dimension in the characteristic information sets using following method: the electronic device may first determine the number x of the user personas having the characteristic information in the interesting dimension of a first user persona group; then determine the total number y of the user personas in the first user persona group, and calculate a third proportion z of the number of the user personas having the characteristic information in the interesting dimension in the first user persona group to the total number of the user personas in the first user persona group, z=x/y; and finally determine whether the third proportion z is greater than a preset threshold b, and determine whether the characteristic information in the interesting dimension is the distinguishing characteristic information in the characteristic information set corresponding to the first user persona group in response to determining that the third proportion z is greater than the preset threshold b.

In some optional implementations of the embodiment, the electronic device may also obtain a plurality of reserved characteristic information sets directly by the cluster analysis on the collected characteristic information, after collecting characteristic information of all target users. Then, a tag corresponding to each of the reserved characteristic information sets may be determined. Finally, similarity between the each of the characteristic information sets and the each of the reserved characteristic information sets may be calculated, and a tag of the reserved characteristic information set having highest similarity to the each of the characteristic information sets may be acquired. The electronic device may use the acquired tag of the reserved characteristic information set as the tag of the each of the characteristic information sets. This step may implement setting the tags for the characteristic information sets directly using a plurality of the set tags of the reserved characteristic information sets. The method of setting a tag for a characteristic information set is simple and strongly universal.

As can be seen from FIG. 4, compared with the embodiment corresponding to FIG. 2, a process 400 of a method for generating information according to the embodiment highlights cluster analysis on characteristic information corresponding to a target service type. Thus, the solution described in the embodiment may generate a reasonable number of characteristic information sets based on service needs. Furthermore, a process 400 of the method for generating information according to the embodiment may automatically complete selecting, clustering, and analyzing relevant characteristic information of the target service type, and reduce the labor costs.

Figure 5:
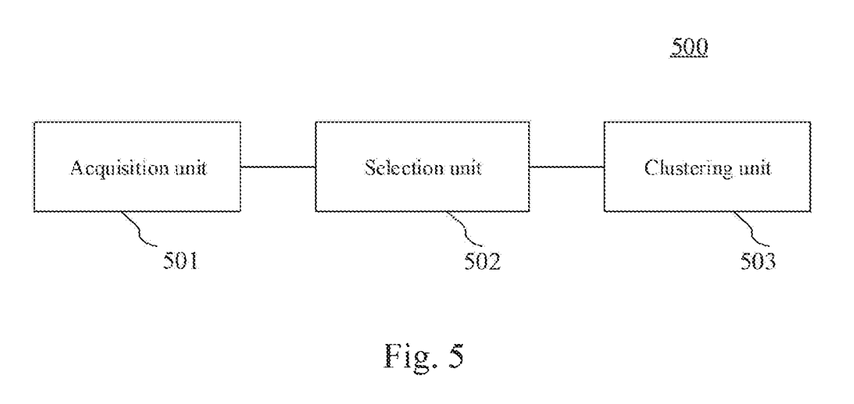
FIG. 5 is a schematic diagram of a structure of an apparatus for generating information according to some embodiments of the disclosure.

Further referring to FIG. 5, as an implementation of the method shown in the above figures, the disclosure provides an embodiment of an apparatus for generating information. The embodiment of the apparatus corresponds to the embodiment of the method shown in FIG. 2. The apparatus may be specifically applied to a variety of electronic devices.

As shown in FIG. 5, an apparatus 500 for generating information according to the embodiment includes: an acquisition unit 501, a selection unit 502, and a clustering unit 503. The acquisition unit 501 is configured for collecting characteristic information of a target user, and dividing the collected characteristic information into at least two dimensions, the characteristic information including user information and user behavior information; the selection unit 502 is configured for selecting the dimension associated with a target service type from the plurality of dimensions; and the clustering unit 503 is configured for generating a target number of characteristic information sets based on cluster analysis on the characteristic information in the selected dimension.

In some optional implementations of the embodiment, the apparatus 500 for generating information further includes: a determination unit, configured for analyzing the characteristic information in each of the characteristic information sets to determine distinguishing characteristic information of the each of the characteristic information sets. The distinguishing characteristic information is used for distinguishing the collected characteristic information from the characteristic information sets.

In some optional implementations of the embodiment, the clustering unit 503 includes: a setting module, configured for setting a K value, where K is a preset number of the characteristic information sets, and K is a positive integer; a first execution module, configured for executing following clustering based on the K value: generating M of the characteristic information sets by the cluster analysis on the characteristic information in the selected dimension using the K value as an initial value of a clustering algorithm, where M is a positive integer; and determining the target number of the characteristic information sets being M in response to determining that M≤K−N, where N is a preset number of tolerable deficiency of the characteristic information sets, and N is a positive integer; and a second execution module, configured for setting K+1 as the K value and continuing the clustering in response to determining that M<K−N.

In some optional implementations of the embodiment, the determination unit is specifically configured for: establishing a user persona group for the each of the characteristic information sets respectively, and performing multi-dimensional description on a user persona in each of the user persona groups based on the characteristic information in the each of the characteristic information sets; determining a first proportion of the number of the user personas having the characteristic information in a first dimension in the each of the user persona groups to the number of the user personas in the each of the user persona groups, where the first dimension is any dimension of the user persona description; determining a second proportion of the number of users having the characteristic information in the first dimension among the target users to the number of the target users; calculating a ratio of the second proportion to the first proportion, and arranging the characteristic information sets in descending order of the ratio, to generate a characteristic information set queue; and acquiring a first preset number of the characteristic information sets successively from the characteristic information set queue, and using the characteristic information in the first dimension as the distinguishing characteristic information of the acquired characteristic information sets.

In some optional implementations of the embodiment, the determination unit is further configured for: determining a third proportion of the number of user personas having the characteristic information in an interesting dimension in a first user persona group to the number of the user personas in the first user persona group, where the first user persona group is any one of the user persona groups; and determining the characteristic information in the interesting dimension as the distinguishing characteristic information of the characteristic information set corresponding to the first user persona group, in response to determining the third proportion being greater than a preset threshold.

In some optional implementations of the embodiment, the apparatus 500 for generating information further includes: a tag setting unit, configured for: obtaining a plurality of reserved characteristic information sets by the cluster analysis on the collected characteristic information, and determining a tag of each of the reserved characteristic information sets; and determining, based on similarity between each of the characteristic information sets and the each of the reserved characteristic information sets, the tag of the each of the characteristic information sets.

Figure 6:
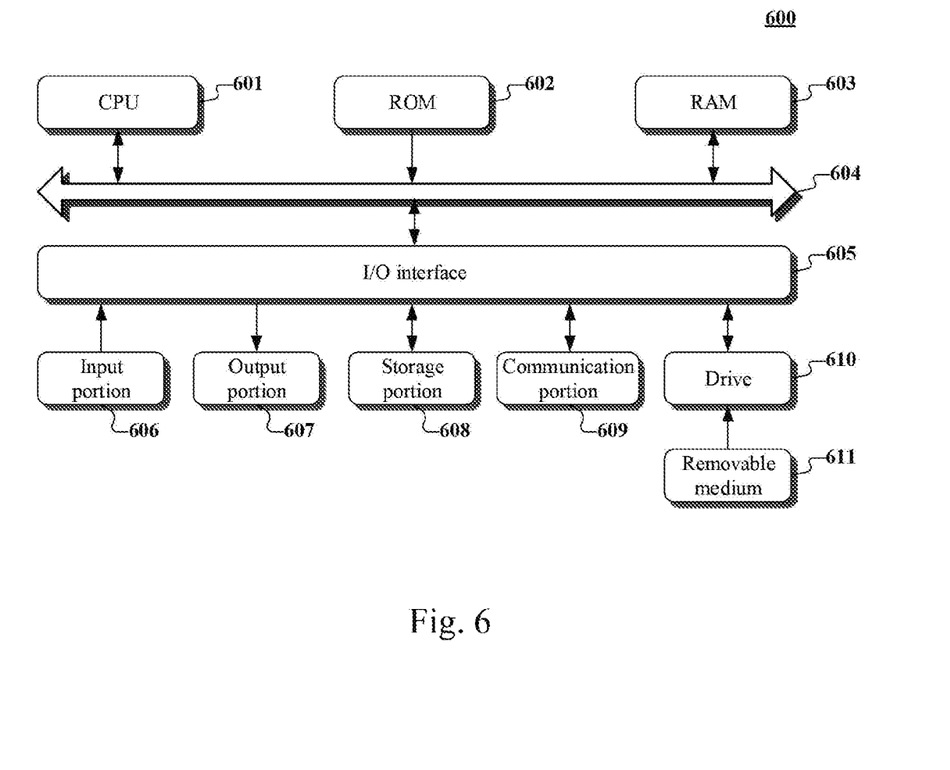
FIG. 6 is a schematic diagram of a structure of a computer system suitable for implementing a terminal device or a server according to some embodiments of the disclosure.

Referring to FIG. 6, a schematic structural diagram of a computer system 600 adapted to implement a terminal device or a server of the embodiments of the present application is shown. The terminal device or server shown in FIG. 6 is merely an example and should not impose any restriction on the function and scope of use of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of some embodiments of the present disclosure. It should be noted that the computer readable medium in some embodiments of the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, a selection unit, and a clustering unit, where the names of these units or modules do not in some cases constitute a limitation to such units or modules themselves. For example, the acquisition unit may also be described as "a unit for collecting characteristic information of a target user, and dividing the collected characteristic information into at least two dimensions."

In another aspect, some embodiments of the present application further provide a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: collect characteristic information of a target user, and divide the collected characteristic information into at least two dimensions, the characteristic information including user information and user behavior information; select the dimension associated with a target service type from the plurality of dimensions; and generate a target number of characteristic information sets based on cluster analysis on the characteristic information in the selected dimension.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for generating information, the method comprising:

collecting characteristic information of a target user, and dividing the collected characteristic information into at least two dimensions, the characteristic information including user information and user behavior information;

selecting the dimension associated with a target service type from a plurality of dimensions;

generating a target number of characteristic information sets based on cluster analysis on the characteristic information in the selected dimension;

establishing a user persona group for each of the characteristic information sets respectively, and determining a first proportion of a number of the user personas including the characteristic information in a first dimension in the each of the user persona groups to the number of the user personas in the each of the user persona groups, wherein the first dimension is any dimension for describing the user persona;

determining a second proportion of the number of users including the characteristic information in the first dimension among the target users to the number of the target users;

calculating a ratio of the second proportion to the first proportion, and arranging the characteristic information sets in descending order of the ratio, to generate a characteristic information set queue; and acquiring a first preset number of the characteristic information sets successively from the characteristic information set queue, and using the characteristic information in the first dimension as a distinguishing characteristic information of the acquired characteristic information sets, wherein the distinguishing characteristic information is used to push customized information to the target user, wherein the method is performed by at least one hardware processor.

2. The method according to claim 1, wherein the generating a target number of characteristic information sets based on cluster analysis on the characteristic information in the selected dimension comprises:

setting a K value, wherein K is a preset number of the characteristic information sets, and K is a positive integer;

executing following clustering based on the K value:
generating M of the characteristic information sets by the cluster analysis on the characteristic information in the selected dimension using the K value as an initial value of a clustering algorithm, wherein M is a positive integer; and determining the target number of the characteristic information sets being M in response to determining that M≥K−N, wherein N is a preset number of tolerable deficiency of the characteristic information sets, and N is a positive integer; and setting K+1 as the K value and continuing the clustering in response to determining that M<K−N.

3. The method according to claim 1, wherein the method comprises:

performing multi-dimensional description on a user persona in each of the user persona groups based on the characteristic information in the each of the characteristic information sets.

4. The method according to claim 3, the method further comprising:

determining a third proportion of the number of user personas including the characteristic information in an interesting dimension in a first user persona group to the number of the user personas in the first user persona group, wherein the first user persona group is any one of the user persona groups; and determining the characteristic information in the interesting dimension as the distinguishing characteristic information of the characteristic information set corresponding to the first user persona group, in response to determining the third proportion being greater than a preset threshold.

5. The method according to claim 1, the method further comprising:

obtaining a plurality of reserved characteristic information sets by the cluster analysis on the collected characteristic information, and determining a tag of each of the reserved characteristic information sets; and determining, based on similarity between each of the characteristic information sets and the each of the reserved characteristic information sets, the tag of the each of the characteristic information sets.

6. An apparatus for generating information, the apparatus comprising:

at least one processor; and a memory storing instructions, the instructions when executed by the at least one processor, cause the at least one processor to perform operations, the operations comprising:

collecting characteristic information of a target user, and dividing the collected characteristic information into at least two dimensions, the characteristic information including user information and user behavior information;

selecting the dimension associated with a target service type from a plurality of dimensions;

generating a target number of characteristic information sets based on cluster analysis on the characteristic information in the selected dimension;

establishing a user persona group for each of the characteristic information sets respectively, and determining a first proportion of a number of the user personas including the characteristic information in a first dimension in the each of the user persona groups to the number of the user personas in the each of the user persona groups, wherein the first dimension is any dimension for describing the user persona;

determining a second proportion of the number of users including the characteristic information in the first dimension among the target users to the number of the target users;

calculating a ratio of the second proportion to the first proportion, and arranging the characteristic information sets in descending order of the ratio, to generate a characteristic information set queue; and acquiring a first preset number of the characteristic information sets successively from the characteristic information set queue, and using the characteristic information in the first dimension as a distinguishing characteristic information of the acquired characteristic information sets, wherein the distinguishing characteristic information is used to push customized information to the target user.

7. The apparatus according to claim 6, wherein the generating a target number of characteristic information sets based on cluster analysis on the characteristic information in the selected dimension comprises:

setting a K value, wherein K is a preset number of the characteristic information sets, and K is a positive integer;

executing following clustering based on the K value: generating M of the characteristic information sets by the cluster analysis on the characteristic information in the selected dimension using the K value as an initial value of a clustering algorithm, wherein M is a positive integer; and determining the target number of the characteristic information sets being M in response to determining that M≥K−N, wherein N is a preset number of tolerable deficiency of the characteristic information sets, and N is a positive integer; and setting K+1 as the K value and continuing the clustering in response to determining that M<K−N.

8. The apparatus according to claim 6, wherein the operations comprise:

performing multi-dimensional description on a user persona in each of the user persona groups based on the characteristic information in the each of the characteristic information sets.

9. The apparatus according to claim 8, wherein for the operations further comprise:

determining a third proportion of the number of user personas including the characteristic information in an interesting dimension in a first user persona group to the number of the user personas in the first user persona group, wherein the first user persona group is any one of the user persona groups; and determining the characteristic information in the interesting dimension as the distinguishing characteristic information of the characteristic information set corresponding to the first user persona group, in response to determining the third proportion being greater than a preset threshold.

10. The apparatus according to claim 6, wherein the operations further comprise:

obtaining a plurality of reserved characteristic information sets by the cluster analysis on the collected characteristic information, and determining a tag of each of the reserved characteristic information sets; and determining, based on similarity between each of the characteristic information sets and the each of the reserved characteristic information sets, the tag of the each of the characteristic information sets.

11. A non-transitory computer-readable storage medium storing a computer program, the computer program when executed by one or more processors, causes the one or more processors to perform operations, the operations comprising:

collecting characteristic information of a target user, and dividing the collected characteristic information into at least two dimensions, the characteristic information including user information and user behavior information;

selecting the dimension associated with a target service type from a plurality of dimensions;

generating a target number of characteristic information sets based on cluster analysis on the characteristic information in the selected dimension;

establishing a user persona group for each of the characteristic information sets respectively, and determining a first proportion of a number of the user personas including the characteristic information in a first dimension in the each of the user persona groups to the number of the user personas in the each of the user persona groups, wherein the first dimension is any dimension for describing the user persona;

determining a second proportion of the number of users including the characteristic information in the first dimension among the target users to the number of the target users;

calculating a ratio of the second proportion to the first proportion, and arranging the characteristic information sets in descending order of the ratio, to generate a characteristic information set queue; and acquiring a first preset number of the characteristic information sets successively from the characteristic information set queue, and using the characteristic information in the first dimension as a distinguishing characteristic information of the acquired characteristic information sets, wherein the distinguishing characteristic information is used to push customized information to the target user.

\* \* \* \* \*